United States Patent
Zhou et al.

(10) Patent No.: US 11,187,961 B2
(45) Date of Patent: Nov. 30, 2021

(54) LIQUID CRYSTAL LENS AND IMAGING DEVICE USING THE SAME

(71) Applicant: BOE TECHNOLOGY GROUP CO., LTD., Beijing (CN)

(72) Inventors: Lijia Zhou, Beijing (CN); Zhidong Wang, Beijing (CN); Junrui Zhang, Beijing (CN); Rongjian Yan, Beijing (CN); Quanguo Zhou, Beijing (CN); Li Tian, Beijing (CN); Yungchiang Lee, Beijing (CN); Meng Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 245 days.

(21) Appl. No.: 16/439,058

(22) Filed: Jun. 12, 2019

(65) Prior Publication Data

US 2020/0073198 A1    Mar. 5, 2020

(30) Foreign Application Priority Data

Aug. 31, 2018 (CN) .......................... 201811011775.3

(51) Int. Cl.
*G02F 1/29*    (2006.01)

(52) U.S. Cl.
CPC ................ *G02F 1/29* (2013.01); *G02F 1/294* (2021.01)

(58) Field of Classification Search
None
See application file for complete search history.

(56) References Cited

U.S. PATENT DOCUMENTS

| | | | |
|---|---|---|---|
| 10,073,201 B2* | 9/2018 | Ma | G02B 5/1885 |
| 10,241,330 B2* | 3/2019 | Popovich | G02F 1/29 |
| 2008/0266388 A1 | 10/2008 | Woodgate et al. | |
| 2011/0216257 A1* | 9/2011 | Galstian | C08J 3/28 |
| | | | 349/33 |
| 2012/0194563 A1 | 8/2012 | Liang et al. | |

(Continued)

FOREIGN PATENT DOCUMENTS

| | | |
|---|---|---|
| CN | 102650790 A | 8/2012 |
| CN | 102722022 A | 10/2012 |

(Continued)

OTHER PUBLICATIONS

First Office Action for Chinese Application No. 201811011775.3, dated Dec. 17, 2020, 7 Pages.

*Primary Examiner* — Ryan Crockett
(74) *Attorney, Agent, or Firm* — Brooks Kushman P.C.

(57) ABSTRACT

A liquid crystal lens and an imaging device including the liquid crystal lens are provided. The liquid crystal lens includes: a first substrate and a second substrate arranged opposite to each other; a liquid crystal layer located between the first substrate and the second substrate; the liquid crystal layer is configured to transmit a first portion of incident light transmitted through the first substrate, and converge the first portion of incident light to a predetermined region of the second substrate; and a light adjustment structure arranged between the first substrate and the second substrate, and configured to enable a second portion of incident light transmitted through the first substrate to be transmitted through the liquid crystal layer and converged to the predetermined region.

18 Claims, 4 Drawing Sheets

(56) References Cited

U.S. PATENT DOCUMENTS

| | | | |
|---|---|---|---|
| 2012/0257131 A1* | 10/2012 | Galstian | G02F 1/134309 |
| | | | 349/36 |
| 2013/0077024 A1 | 3/2013 | Shikii et al. | |
| 2013/0235304 A1* | 9/2013 | Lee | G02F 1/29 |
| | | | 349/96 |
| 2014/0049682 A1* | 2/2014 | Galstian | G02F 1/1347 |
| | | | 348/356 |
| 2018/0052377 A1* | 2/2018 | Gordon | G02F 1/29 |
| 2018/0088413 A1* | 3/2018 | Jang | G02F 1/1343 |
| 2018/0107012 A1 | 4/2018 | Xu et al. | |
| 2021/0072429 A1* | 3/2021 | Meng | G02B 27/0172 |

FOREIGN PATENT DOCUMENTS

| | | |
|---|---|---|
| CN | 102959464 A | 3/2013 |
| CN | 105093775 A | 11/2015 |
| CN | 105629622 A | 6/2016 |

\* cited by examiner

LIQUID CRYSTAL LENS AND IMAGING DEVICE USING THE SAME

CROSS-REFERENCE TO RELATED APPLICATION

This application claims priority to Chinese Patent Application No. 201811011775.3 filed on Aug. 31, 2018, which is incorporated herein by reference in its entirety.

TECHNICAL FIELD

The present disclosure relates to the field of lens technologies, and in particular to a liquid crystal lens and an imaging device using the same.

BACKGROUND

A liquid crystal lens may be controlled by an electric field. Through applying different voltages for different electrodes, liquid crystal molecules located in an electric field are deflected, and light is dispersed or converged to realize characteristics of an optical lens. At present, a liquid crystal lens of circular hole type can be integrated with a camera. By replacing the optical lens used in a traditional camera with the liquid crystal lens, an effect of fast focal length adjustment and reducing volume of a focusing device can be realized.

When the camera adopts the liquid crystal lens, light reflected by an object being photographed is transmitted to a lens system, and is focused on an image sensor chip through the liquid crystal lens. Light passing through a circular hole in the lens system is called effective light, which is used for forming an image of the object being photographed. During an imaging process, if other light other than light passing through the circular hole is transmitted to a sensor chip, image quality will be adversely affected. A conventional processing method is to apply a layer of light-shielding tape on the outside of a substrate of the liquid crystal lens, so that only the light that passing through the circular hole and retained by the light-shielding tape is transmitted to the sensor chip. However, using the above processing method, since a portion of the light reflected by the object being photographed may be lost due to reflection and refraction during transmission inside the liquid crystal lens, and finally only a portion of light passing through the circular hole can be received by the image sensor chip, so energy of light received by the image sensor chip is very different from energy of light actually reflected by the object being photographed, and thus the process of photographing the object image may be adversely affected in case of poor light conditions.

In addition, when an environment in which the object being photographed is located is dark, the smaller the aperture of the circular hole in the lens system, the less effective light that is transmitted to the sensor chip, and the poorer the shooting effect; however, if the aperture is increased, in addition to increasing volume of the liquid crystal lens itself, and limiting an application field of the liquid crystal lens, it also occupies the space for peripheral circuit design and increases difficulties of the peripheral circuit design; more importantly, increasing the aperture will increase thickness of liquid crystal cell correspondingly, resulting in an increase in response time of liquid crystal.

SUMMARY

In one aspect, an embodiment of the present disclosure provides a liquid crystal lens, including: a first substrate and a second substrate arranged opposite to each other; a liquid crystal layer located between the first substrate and the second substrate; the liquid crystal layer is configured to transmit a first portion of incident light transmitted through the first substrate, and converge the first portion of incident light to a region of the second substrate; and a light adjustment structure arranged between the first substrate and the second substrate, and configured to enable a second portion of incident light transmitted through the first substrate to be transmitted through the liquid crystal layer and converged to the region of the second substrate.

Optionally, in the liquid crystal lens, the second portion of incident light surrounds the first portion of incident light within the first substrate.

Optionally, in the liquid crystal lens, the light adjustment structure includes: a transflective layer arranged between the liquid crystal layer and the first substrate, and configured to transmit the first portion of incident light and the second portion of incident light transmitted through the first substrate; and a reflective structure layer arranged between the liquid crystal layer and the second substrate. The reflective structure layer is configured to receive the second portion of incident light, and reflect the second portion of incident light in a direction toward the liquid crystal layer, and the transflective layer is further configured to reflect the second portion of incident light.

Optionally, in the liquid crystal lens, a transmission direction of the second portion of incident light transmitted through the liquid crystal layer toward the region of the second substrate is parallel to a secondary optical axis of a lens structure formed by the liquid crystal layer.

Optionally, in the liquid crystal lens, the reflective structure layer includes: a base provided with a tapered curved groove, wherein the tapered curved groove penetrates through the base in a direction perpendicular to the first substrate and the second substrate, the tapered curved groove is provided with a first opening on an end surface of the base proximate to the first substrate, and provided with a second opening on an end surface of the base distal to the first substrate, and a diameter of the first opening is greater than a diameter of the second opening; and a reflective layer arranged on a surface of the tapered curved groove proximate to the first substrate, wherein the reflective layer is configured to receive the second portion of incident light, and reflect the second portion of incident light in the direction toward the liquid crystal layer. A center line of the second opening coincides with a center line of the region of the second substrate, and the diameter of the second opening is greater than or equal to a diameter of the region of the second substrate.

Optionally, in the liquid crystal lens, the reflective layer is formed as a reflective film arranged on the base, or formed as a reflective prism structure on the base.

Optionally, in the liquid crystal lens, the reflective structure layer further includes: a light shielding layer attached to a surface of the base distal to the first substrate.

Optionally, the liquid crystal lens further includes: a transparent common electrode arranged between the first substrate and the liquid crystal layer; a second electrode arranged on the reflective layer and being transparent; and a third electrode arranged at the second opening of the first substrate and being transparent.

Optionally, in the liquid crystal lens, the transflective layer is arranged between the liquid crystal layer and the common electrode, and an insulating layer is arranged between the transflective layer and the common electrode.

Optionally, in the liquid crystal lens, the reflective structure layer is in direct physical contact with a surface of the second substrate proximate to the first substrate.

Optionally, in the liquid crystal lens, an orthographic projection of the liquid crystal layer onto the first substrate coincides with an orthographic projection of the transflective layer onto the first substrate; or the orthographic projection of the liquid crystal layer onto the first substrate is within a range of the orthographic projection of the transflective layer on the first substrate, and an area of the orthographic projection of the liquid crystal layer onto the first substrate is smaller than an area of the orthographic projection of the transflective layer onto the first substrate.

Optionally, in the liquid crystal lens, an orthographic projection of the transflective layer onto the first substrate is within a range of an orthographic projection of the liquid crystal layer onto the first substrate.

Optionally, in the liquid crystal lens, an infrared-light-and-ultraviolet-light-blocking layer is attached to a surface of the second substrate distal to the first substrate.

Optionally, in the liquid crystal lens, the second portion of incident light transmitted through the first substrate is converged to the region of the second substrate after the second portion of incident light transmitted through the first substrate is transmitted through the liquid crystal layer for at least three times under control of reflection of the light adjustment structure.

In another aspect, an embodiment of the present disclosure further provides an imaging device, including the liquid crystal lens according to the liquid crystal lens in any one of the above paragraphs.

Optionally, the imaging device further includes an image sensor, wherein light converged to the region of the second substrate is transmitted through the region of the second substrate toward the image sensor.

DETAILED DESCRIPTION

Figure 1:
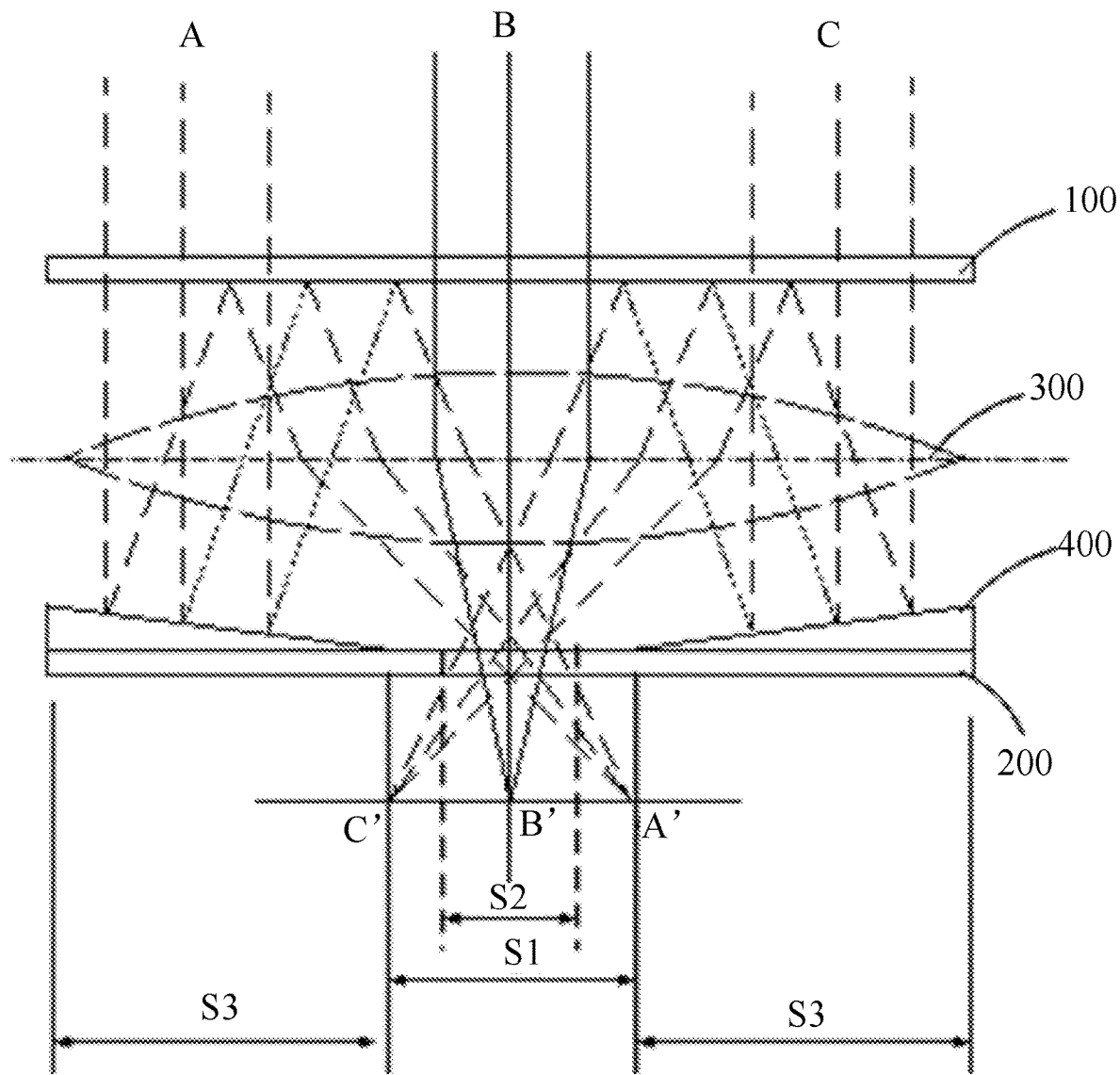
FIG. 1 is a schematic structural diagram of a transmission optical path of a liquid crystal lens according to an embodiment of the present disclosure.

In order to make technical problems, technical solutions and advantages to be solved by the embodiments of the present disclosure more clear, detailed description will be made below in conjunction with the accompanying drawings and specific embodiments.

In order to solve a problem in the related art that imaging effect of a liquid crystal lens is poor when the environment is dark, the embodiments of the present disclosure provides a liquid crystal lens which, by providing a light adjustment structure, can enable incident light transmitted through an edge portion of a liquid crystal layer (i.e., a second portion of incident light) to be reflected in the liquid crystal layer multiple times and then converged to a central part of the liquid crystal layer, so as to be used for forming an image after being transmitted through the liquid crystal layer, thereby realizing full utilization of incident light to improve the imaging effect when the environment is dark.

A specific embodiment of the present disclosure provides a liquid crystal lens, including: a first substrate and a second substrate arranged opposite to each other; a liquid crystal layer located between the first substrate and the second substrate; the liquid crystal layer is configured to transmit a first portion of incident light transmitted through the first substrate, and converge the first portion of incident light to a predetermined region of the second substrate; and a light adjustment structure arranged between the first substrate and the second substrate, and configured to enable the second portion of incident light transmitted through the first substrate to be transmitted through the liquid crystal layer and converged to the predetermined region of the second substrate.

It should be appreciated that, it may provide a first electrode group between the first substrate and the liquid crystal layer, and provide a second electrode group between the second substrate and the liquid crystal layer, such that the liquid crystal layer has a lens function, and the first portion of incident light transmitted through the first substrate is transmitted and converged to the predetermined region of the second substrate. Referring to a schematic structural diagram of a transmission optical path of the liquid crystal lens according to an embodiment of the present disclosure shown in FIG. 1, a voltage is applied between the first electrode group and the second electrode group to control liquid crystal molecules of the liquid crystal layer between the first substrate 100 and the second substrate 200 to be deflected, so that the liquid crystal layer has the lens function, and the lens structure 300 is formed. It should be appreciated that the lens structure 300 is a non-entity structure, which is a lens function capable of converging light generated by the deflection of the liquid crystal molecules in the liquid crystal layer. According to FIG. 1, incident light entering the first substrate 100 is transmitted through the first substrate 100 to form an incident light beam A, an incident light beam B, and an incident light beam C, and usually the incident light beam A, the incident light beam B and the incident light beam C perpendicularly enter the first substrate 100. After the incident light beam B is transmitted through the lens structure 300 and converged, it is converged to a second region S2 of the second substrate 200, and light transmitted through the second region S2 can be transmitted to an image transmission sensor located on a side of the second substrate 200 distal to the first substrate 100 for forming an image. An orthographic projection of a central region on the first substrate 100 onto the second substrate 200 is formed as the first region S1, and the incident light entering the central region on the first substrate 100, that is, the incident light beam B, is formed as the first portion of incident light described above, and the first portion of incident light can be directly transmitted through the second region S2 on the second substrate 200 after it is transmitted through the lens structure 300 and converged.

Within the first substrate 100, the incident light beam A and the incident light beam C surround the incident light beam B, and the incident light beam A and the incident light beam C are formed as the second portion of incident light, that is, the incident light located at an edge portion of the lens structure 300 formed by the liquid crystal layer.

Further, in the liquid crystal lens of the embodiments of the present disclosure, a light adjustment structure 400 is further disposed between the first substrate 100 and the second substrate 200. Through the light adjustment structure 400, the incident light beam A and the incident light beam C can be reflected multiple times within the liquid crystal layer between the first substrate 100 and the second substrate 200, and transmitted through the lens structure 300 and converged to the second region S2 of the second substrate 200. The incident light beam A and the incident light beam C is transmitted through an edge region of the first substrate 100, and an orthographic projection of the edge region onto the second substrate 200 is formed as a third region S3; in other words, the incident light beam entering the edge region of the first substrate 100 is the second portion of incident light, and the second portion of incident light can be reflected multiple times within the liquid crystal layer between the first substrate 100 and the second substrate 200, and then transmitted through the lens structure 300 and converged to the second region S2 on the second substrate 200.

According to the above, in conjunction with FIG. 1, the second region S2 on the second substrate 200 is the "predetermined region" in the present disclosure, that is, the first portion of incident light and the second portion of incident light are converged to a region of the second substrate after the first portion of incident light and the second portion of incident light are transmitted through the lens structure 300.

Specifically, the predetermined region is a central region of the second substrate corresponding to the camera when the liquid crystal lens is used to integrate with the camera to form an image. It should be appreciated that the lens structure generally converges incident light transmitted through the central region of the camera to form an image. Therefore, the incident light beam B described above is generally incident light beam transmitted through the central region of the camera, and the incident light beam A and the incident light beam C are light beams located outside the incident light beam B.

Based on above relationship, it should be appreciated that, in conjunction with FIG. 1, the third region S3 surrounds the first region S1, the second region S2 is located within the first region S1, or the second region S2 is a same region as the first region S1.

In the liquid crystal lens according to the embodiments of the present disclosure, it provides the light adjustment structure to enable light transmitted through the edge portion of the liquid crystal layer (i.e., the incident light beam A and the incident light beam C) to be reflected in the liquid crystal layer multiple times and then converged to the central part of the liquid crystal layer and transmitted through the liquid crystal layer to form an image, thereby realizing full utilization of incident light. It should be appreciated that the central part of the liquid crystal layer is a central part of the lens structure 300.

The specific structure of the liquid crystal lens according to the embodiments of the present disclosure will be described in detail below with reference to FIGS. 2 to 4.

Figure 2:
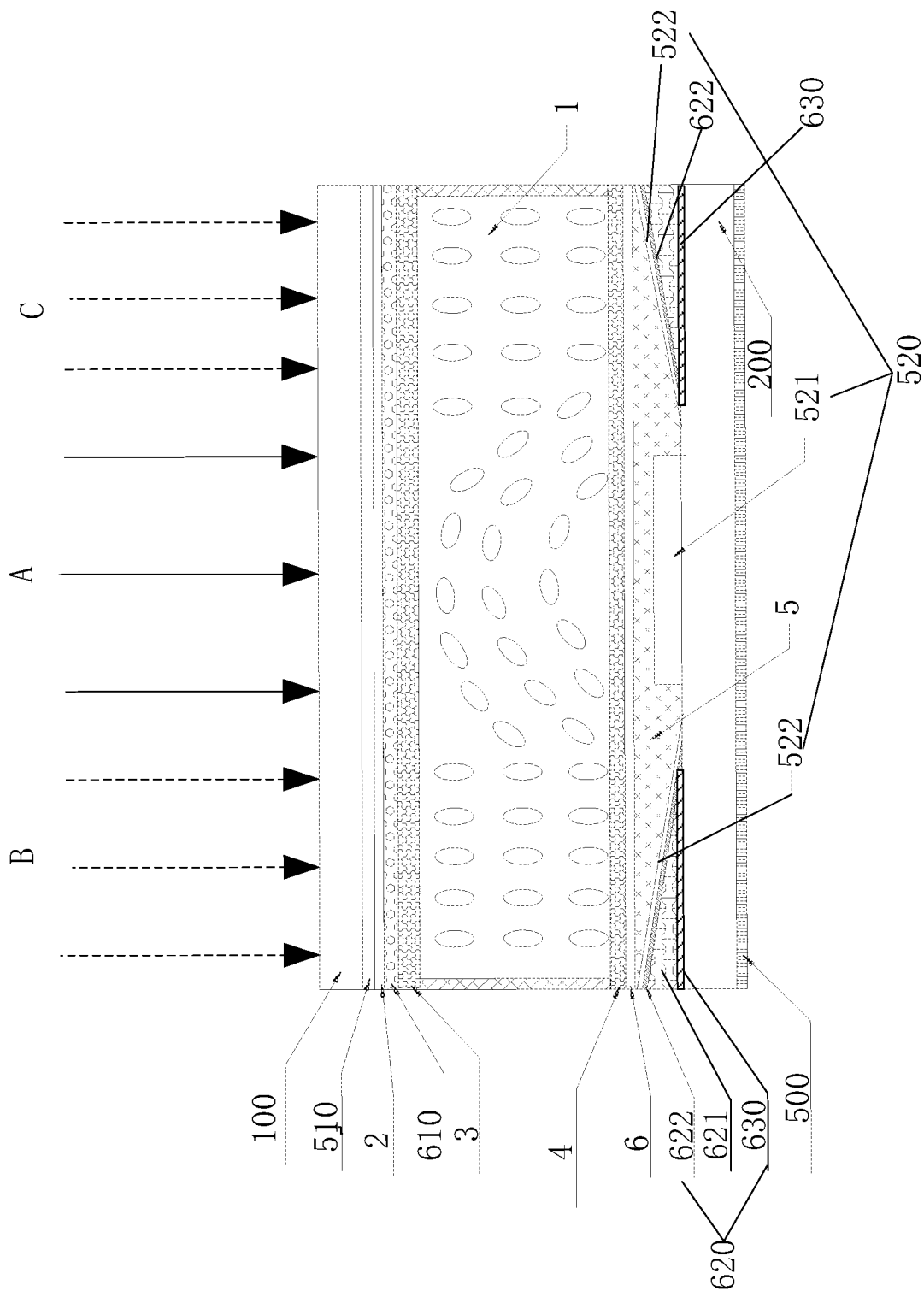
FIG. 2 is a schematic diagram of an implementation structure of the liquid crystal lens according to an embodiment of the present disclosure.

FIG. 2 is a schematic diagram of an implementation structure of the liquid crystal lens according to an embodiment of the present disclosure. Referring to FIG. 2, in the implementation structure, the liquid crystal lens includes a first substrate 100 and a second substrate 200 arranged opposite to each other, and a liquid crystal layer 1 between the first substrate 100 and the second substrate 200. It should be appreciated that the first substrate 100 and the second substrate 200 are transparent substrates and can transmit incident light.

In addition, the liquid crystal lens further includes a first electrode group 510 between the first substrate 100 and the liquid crystal layer 1, and a second electrode group 520 between the second substrate 200 and the liquid crystal layer 2. The liquid crystal layer 1 is used to form the lens structure by a voltage applied between the first electrode group 510 and the second electrode group 520.

In the embodiments of the present disclosure, optionally, the second electrode group 520 includes a second electrode 521 located at a center and a third electrode 522 arranged around the second electrode 521.

In the embodiments of the present disclosure, the first electrode group 510 includes a planar common electrode formed to be transparent, and may be arranged corresponding to an area of an entirety of the liquid crystal layer 1, and can transmit light transmitted through the first substrate 100. The second electrode 521 is also formed as a transparent electrode. It should be appreciated that the second electrode 521 can also be formed as a hole-shaped electrode, that is, a hole-shaped electrode formed by a conductive material.

Based on the first electrode group 510 and the second electrode group 520 arranged above, when a first driving voltage V1 is applied between the first electrode group 510 and the second electrode 521, and a second driving voltage V2 is applied between the first electrode group 510 and the third electrode 522, the lens structure can be formed; values of the first driving voltage V1 and the second driving voltage V2 may be adjusted, to change equivalent curvature radius of the lens structure to achieve an effect of adjusting focal length, and can also realize positive and negative lens conversion.

In the embodiments of the present disclosure, the liquid crystal lens further includes: the light adjustment structure, arranged between the first substrate 100 and the second substrate 200, and configured to enable a portion of incident light transmitted into the liquid crystal layer 1 through the first substrate 100 to be reflected multiple times within the liquid crystal layer and then transmitted through the lens structure formed by the liquid crystal layer 1 and converged.

Specifically, as shown in FIG. 2, in the implementation structure, the light adjustment structure includes: a transflective layer 610 arranged between the liquid crystal layer 1 and the first substrate 100, and configured to transmit the first portion of incident light and the second portion of incident light transmitted through the first substrate 100; and a reflective structure layer 620 arranged between the liquid crystal layer 1 and the second substrate 200. The reflective structure layer 620 is configured to receive the second portion of incident light, and reflect the second portion of incident light in a direction toward the liquid crystal layer 1, and the transflective layer 610 is further configured to reflect the second portion of incident light, that is, reflect the light reflected by the reflective structure layer 620.

As shown in combination with FIG. 1 and FIG. 2, the transflective layer 610 is used to transmit all incident light transmitted through the first substrate 100 (that is, including the first portion of incident light and the second portion of incident light). The first portion of incident light transmitted through the transflective layer 610 (corresponding to the incident light beam B in FIG. 1) is transmitted in a direction toward the second substrate 200 after being transmitted through the transflective layer 610, and can be directly transmitted through the second region S2 on the second substrate 200 after being transmitted through the lens structure and converged. The second region S2 corresponds to a region of an orthographic projection of the second electrode 521 onto the second substrate 200, or is located within the region of the orthographic projection of the second electrode 521 onto the second substrate 200.

According to the above, the first portion of incident light (i.e., the incident light beam B) is light transmitted in a direction toward the second electrode 521; when an orthographic projection of a corresponding region of the first substrate 100 corresponding to the first portion of incident light onto the second substrate 200 forms the first region S1, the region of the orthographic projection of the second electrode 521 onto the second substrate 200 is located within the first region S1 or coincides with the first region S1.

Further, in combination with FIG. 1 and FIG. 2, in one implementation of the present disclosure, the reflective structure layer 620 is configured to receive the second portion of incident light (i.e., the incident light beam A and the incident light beam C) transmitted through the first substrate 100, and reflect the second portion of incident light in a direction toward the liquid crystal layer.

In the embodiments of the present disclosure, the reflective structure layer 620 is arranged around the second electrode 521. In combination with FIG. 2, an orthographic projection of the reflective structure layer 620 onto the second substrate 200 is located in the third region S3, or coincides with the third region S3.

It should be appreciated that, typically the first portion of incident light and the second portion of incident light perpendicularly enter the first substrate 100. Based on such structure, in the embodiments of the present disclosure, in combination with FIG. 1 and FIG. 2, the reflective structure layer 620 is an inclined state compared to the first substrate 100, and when the second portion of incident light perpendicularly enters the first substrate 100 and is then transmitted through the transflective layer 610 and then enters the reflective structure layer 620 in an inclined state, the transflective layer 610 is capable of reflecting incident light, and the reflected light can be transmitted to the transflective layer 610 for reflection again. Optionally, through the reflection of the transflective layer 610, a transmission direction of the reflected light is parallel to a secondary optical axis of the lens structure formed by the liquid crystal layer 1. As a result, through a light convergence of the lens structure, as shown in FIG. 1, the reflected light is converged at the convergence point A' or C', and the convergence points A' and C' are located at the same focal plane as a convergence point B' formed after the first portion of incident light is transmitted through the lens structure and converged. Specifically, the reflected light is transmitted through the second region S2 on the second substrate 200.

Based on the above principle, it provides a inclined angle of the reflective structure layer 620 and a structure of a reflective surface, so that a transmission direction of the second portion of incident light transmitted through the liquid crystal layer 1 toward the second region S2 (i.e., the predetermined region) is parallel to a secondary optical axis of the lens structure, and a convergence point of the second portion of incident light transmitted through the liquid crystal layer is located at the same focal plane, which corresponds to the light-transmitting region on the second substrate 200, that is, transmitted through the second region S2 on the second substrate 200.

Figure 3:
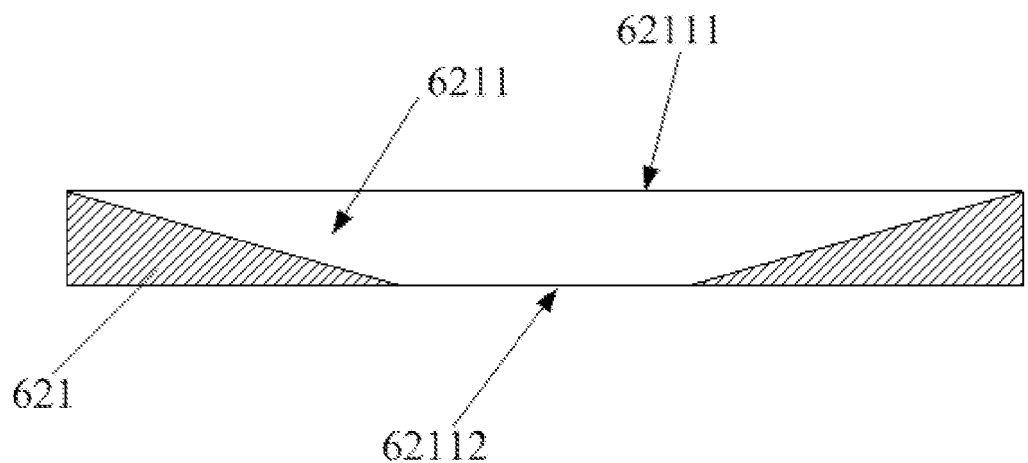
FIG. 3 is a schematic diagram of a base structure of a reflective structure layer in the liquid crystal lens according to an embodiment of the present disclosure.

In the embodiments of the present disclosure, as shown in FIGS. 2 and 3, the reflective structure layer 620 specifically includes: a base 621 provided with a tapered curved groove 6211, wherein the tapered curved groove 6211 penetrates through the base 621 in a direction perpendicular to the first substrate 100 and the second substrate 200, the tapered curved groove 6211 is provided with a first opening 62111 on an end surface of the base 621 proximate to the first substrate 100, and provided with a second opening 62112 on an end surface of the base 621 distal to the first substrate 100, and a diameter of the first opening 62111 is greater than a diameter of the second opening 62112; a reflective layer 622 arranged on a surface of the tapered curved groove 6211 proximate to the first substrate 100, wherein the reflective layer 622 is configured to receive the second portion of incident light, and reflect the second portion of incident light in the direction toward the liquid crystal layer. In combination with FIGS. 2 to 3, a center line of the second opening 62112 coincides with a center line of the second region S2, and the diameter of the second opening 62112 is greater than or equal to a diameter of the second region S2.

Specifically, the second opening 62112 formed by the tapered curved groove 6211 is configured to accommodate the second electrode 521. It should be appreciated that the center of the second electrode 521 is typically the center of the lens structure 300.

Optionally, the reflective layer 622 is formed as a reflective film arranged on the base 621 or as a reflective prism structure on the base 621. It should be appreciated that the reflective prism structure includes a plurality of prism surfaces each having a shape of a triangle, a sphere or the like, and the incident light can be reflected in a certain direction by determining an inclined angle of the prism surface.

In addition, in the embodiments of the present disclosure, as shown in FIG. 2, the reflective structure layer 620 may further include: a light shielding layer 630 attached to the surface of the base 621 distal to the first substrate 100. With an arrangement of the light shielding layer 630, light transmitted to the reflective structure layer 620 will not be transmitted through the reflective structure layer 620, but is reflected toward the inside of the liquid crystal layer 1 through the reflective layer 622.

In an implementation structure of the liquid crystal lens according to the embodiments of the present disclosure, as shown in FIG. 1 and FIG. 2, an orthographic projection of the liquid crystal layer 1 onto the first substrate 100 coincides with an orthographic projection of the transflective layer 610 onto the first substrate 100; or the orthographic projection of the liquid crystal layer 1 onto the first substrate 100 is within a range of the orthographic projection of the transflective layer 610 on the first substrate 100, and an area of the orthographic projection of the liquid crystal layer 1 onto the first substrate 100 is smaller than an area of the orthographic projection of the transflective layer 610 onto the first substrate 100.

In the implementation structure, the transflective layer 610 located between the liquid crystal layer 1 and the first substrate 100 is arranged corresponding to the entire liquid crystal layer 1, or the transflective layer 610 is larger than an arrangement region of the liquid crystal layer 1, so that all light reflected through the reflective structure layer 620 into the liquid crystal layer 1 can be transmitted to the transflective layer 610, and converged after reflected by the transflective layer 610 for forming an image.

In the embodiments of the present disclosure, the transflective layer 610 is provided as a structure for transmitting light transmitted from a direction of the first substrate 100 and for reflecting light transmitted from a direction of the liquid crystal layer 1. The transflective layer for realizing this function may be realized by a liquid crystal layer or by providing a reflective prism on a surface of the transparent substrate used as a reflective layer. A person skilled in the art may understand the specific structure of the transflective layer 610 having this function, and will not be described in detail herein.

Hereinafter, in one implementation structure of the liquid crystal lens according to the embodiments of the present disclosure, a connection relationship between members will be described with reference to FIG. 2.

Referring to FIG. 2, in the implementation structure, the first substrate 100 is connected to the first electrode group 510 through attachment, and the first electrode group 510 is arranged on the surface of the first substrate 100 proximate to the second substrate 200; the transflective layer 610 is arranged opposite to the first electrode group 510 with an insulating layer 2 arranged therebetween for realizing insulation between the first electrode group 510 and the transflective layer 610; for example, when the transflective layer 610 includes electrodes and a liquid crystal layer arranged opposite to each other, and liquid crystal molecules in the liquid crystal layer may be deflected through energizing electrodes, so as to realize function of the transflective layer, insulation between the first electrode group 510 and the electrodes of the transflective layer is realized by arrangement of the insulating layer 2. In the embodiments of the present disclosure, when the transflective layer 610 is implemented by providing a reflective prism on a surface of the transparent substrate used as a reflective layer, the transflective layer 610 can be directly formed on the first electrode group 510 without providing the insulation layer 2.

In addition, a first alignment layer 3 is arranged on a surface of the transflective layer 610 distal to the first substrate 100, and the first alignment layer 3 is arranged opposite to the second alignment layer 4, and space between the first alignment layer 3 and the second alignment layer 4 is formed as a liquid crystal layer accommodation space in which the liquid crystal layer 1 is filled.

Further, a second electrode 521 of the second electrode group 520 and a reflective structure layer 620 of the light adjustment structure are arranged on the second substrate 200. The second electrode 521 is located at the center of the base 621 of the reflective structure layer 620, that is, the base 621 of the reflective structure layer 620 is arranged around the second electrode 521, wherein the reflective layer 622 and the third electrode 522 are sequentially arranged on an inner wall of the tapered curved groove 6211 of the base 621.

According to FIG. 2, since the inner wall of the tapered curved groove 6211 is formed as an inclined plane with respect to the first substrate 100 and the second substrate 200 (it should be appreciated that the first substrate 100 is generally parallel to the second substrate 200), the reflective layer 622 and the third electrode 522 are inclined with respect to the first substrate 100 and the second substrate 200.

According to FIG. 2, the tapered curved groove 6211 of the base 621 is filled with a transparent silicon dioxide layer 5, so that a surface on which the above member is arranged above the second substrate 200 is formed as a plane. Further, a high resistance layer 6 and the above second alignment layer 4 are arranged sequentially on the silicon dioxide layer 5.

Further, according to FIG. 2, a light shielding layer 630 is attached to the surface of the base 621 distal to the first substrate 100. Based on such structure, the light shielding layer may be fabricated on the second substrate 200 together with the second electrode by a semiconductor coating technique to improve light shielding performance, and enable the light shielding layer 630 to be fabricated inside the liquid crystal lens and prevented from being damaged.

In the liquid crystal lens of the above-described embodiments of the present disclosure, as shown in FIG. 2 in combination with FIG. 1, it provides a light adjustment structure in the liquid crystal lens, so that the incident light beam A and the incident light beam C (i.e., ineffective light beams in the related art) transmitted through the first substrate and located on the edge of effective light (the incident light beam B) are converted into the effective light beams after being reflected multiple times in the liquid crystal layer, and thus more light is transmitted through a corresponding region of the second electrode at the second substrate, thereby realizing a purpose of increasing light intensity, and ensuring that amount of light obtained by the image sensor arranged corresponding to the liquid crystal lens is closer to amount of light actually reflected by the object being photographed. In this way, even in a poor light environment, the amount of light close to the mount of light of the object being photographed can be obtained, so it is helpful to improve shooting quality.

It should be appreciated that the specific structure of the light adjustment structure arranged in the liquid crystal lens is merely an example, and is not limited thereto when it is implemented.

Figure 4:
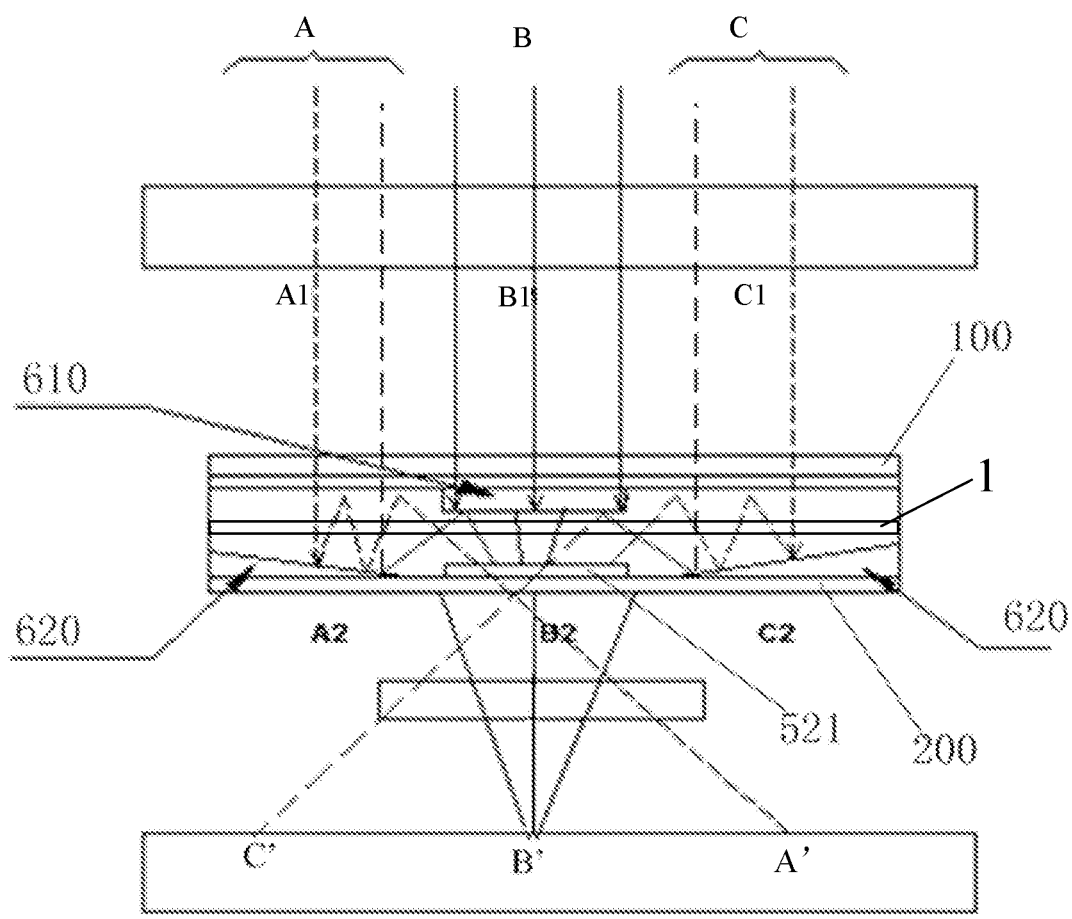
FIG. 4 is a schematic diagram of a principle of an implementation structure of the liquid crystal lens according to an embodiment of the present disclosure.

For example, in the above implementation structure, the transflective layer 610 is arranged corresponding to the entire liquid crystal layer 1, or the transflective layer 610 is larger than the arrangement region of the liquid crystal layer 1, and in another implementation structure of the liquid crystal lens of the present disclosure, as shown in the structural diagram of FIG. 4, the arrangement region of the transflective layer 610 may be smaller than the entire arrangement region of the liquid crystal layer 1, that is, the orthographic projection of the transflective layer 610 onto the first substrate 100 is located within a range of the orthographic projection of the liquid crystal layer 1 onto the first substrate 100. When such structure is adopted for specifically fabrication, the transflective layer 610 forms a predetermined pattern on the insulating layer 2. And optionally, in order to ensure uniformity of light transmitted through the liquid crystal lens, a center line of the transflective layer 610 is in the same line as a center line of the liquid crystal layer 1, that is, the transflective layer 610 is arranged on the same center line as the liquid crystal layer 1. It should be appreciated that the transflective layer 610 is also arranged on the same center line as the second electrode 521. It should be appreciated that, the specific shape of the pattern formed on the insulating layer 2 by the transflective layer 610 is not limited thereto, as long as the reflection of at least portion of incident light of the incident light beam A and the incident light beam C can be realized.

With the above arrangement, as compared with a solution where the transflective 610 is entirely formed over the liquid crystal layer 1, it is possible to avoid a problem that the arrangement of the transflective layer 610 adversely affects light energy of the incident light beam A and the incident light beam C transmitted inside the liquid crystal lens.

In another implementation structure of the liquid crystal lens of the embodiments of the present disclosure, the light shielding layer 630 is not limited to being formed only between the second substrate 200 and the base 621. Optionally, the light shielding layer 630 can be fabricated on the surface of the second substrate 200 distal to the base 621, and arranged according to the corresponding region of the base 621 on the surface.

In another implementation structure of the liquid crystal lens according to the embodiments of the present disclosure, the reflective structure layer 620 is not limited to the above structure including the base 621 and the reflective layer 622. For example, the base 620 may be integrally connected to the second substrate 200, such that a surface of the second substrate 200 proximate to the first substrate 100 is formed as a structure in which a tapered curved groove is arranged as shown in FIG. 2. Based on such structure, the reflective structure layer 620 can be directly arranged on the second substrate 200, and is in direct physical contact with a surface of the second substrate 200 proximate to the first substrate.

In the embodiments of the present disclosure, in the above liquid crystal lens, optionally, as shown in FIG. 2, an infrared-light-and-ultraviolet-light-blocking layer 500 is attached to the surface of the second substrate 200 distal to the first substrate 100 for blocking the infrared light and the ultraviolet light. By using this arrangement, as compared with the related art, an optical device on the imaging device to which the liquid crystal lens is applied may be reduced, and light loss that is transmitted to the sensor chip of the imaging device can be reduced, which is advantageous for improving the imaging effect.

Figure 5:
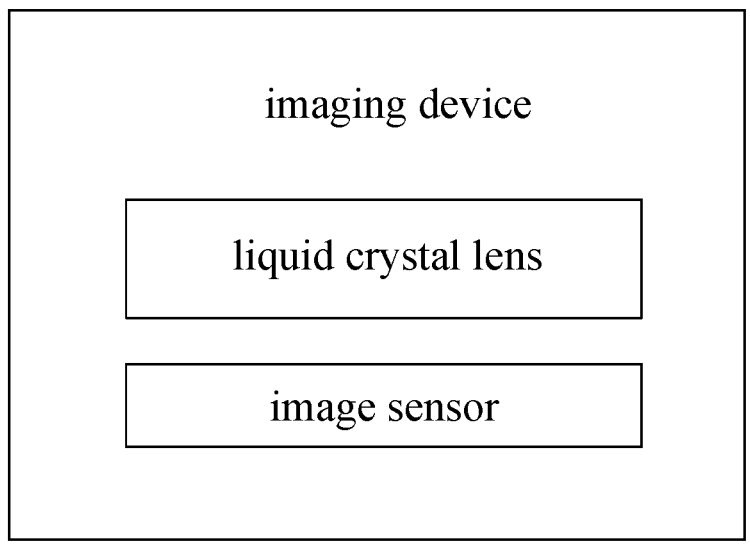
FIG. 5 is a block diagram of an imaging device according to an embodiment of the present disclosure.

As shown in FIG. 5, another aspect of an embodiment of the present disclosure further provides an imaging device including the liquid crystal lens of the above structure.

Further, as shown in FIG. 5, the imaging device of the embodiments of the present disclosure further includes an image sensor, wherein the imaging device of the embodiments of the present disclosure further includes an image sensor, wherein light converged to the predetermined region of the second substrate is transmitted through the predetermined region toward the image sensor.

According to the above detailed description of the liquid crystal lens according to the embodiments of the present disclosure, a person skilled in the art may understand the specific structure of the imaging device using the liquid crystal lens of the embodiments of the present disclosure, which will not be described in detail herein.

The above are merely preferred embodiments of the present disclosure, and it should be noted that a person skilled in the art can make various improvements and modifications without departing from principles of the present disclosure, and these improvements and modifications should also be considered as falling into the protection scope of the present disclosure.

What is claimed is:

1. A liquid crystal lens, comprising:
    a first substrate and a second substrate arranged opposite to each other;
    a liquid crystal layer located between the first substrate and the second substrate;
    the liquid crystal layer is configured to transmit a first portion of incident light transmitted through the first substrate, and converge the first portion of incident light to a region of the second substrate; and
    a light adjustment structure arranged between the first substrate and the second substrate, and configured to enable a second portion of incident light transmitted through the first substrate to be transmitted through the liquid crystal layer and converged to the region of the second substrate,
    wherein the light adjustment structure comprises:
    a transflective layer arranged between the liquid crystal layer and the first substrate, and configured to transmit the first portion of incident light and the second portion of incident light transmitted through the first substrate; and
    a reflective structure layer arranged between the liquid crystal layer and the second substrate,
    wherein the reflective structure layer is configured to receive the second portion of incident light, and reflect the second portion of incident light in a direction toward the liquid crystal layer, and the transflective layer is further configured to reflect the second portion of incident light.

2. The liquid crystal lens according to claim 1, wherein the second portion of incident light surrounds the first portion of incident light within the first substrate.

3. The liquid crystal lens according to claim 1, wherein a transmission direction of the second portion of incident light transmitted through the liquid crystal layer toward the region of the second substrate is parallel to a secondary optical axis of a lens structure formed by the liquid crystal layer.

4. The liquid crystal lens according to claim 1, wherein the reflective structure layer comprises:
    a base provided with a tapered curved groove, wherein the tapered curved groove penetrates through the base in a direction perpendicular to the first substrate and the second substrate, the tapered curved groove is provided with a first opening on an end surface of the base proximate to the first substrate, and provided with a second opening on an end surface of the base distal to the first substrate, and a diameter of the first opening is greater than a diameter of the second opening; and
    a reflective layer arranged on a surface of the tapered curved groove proximate to the first substrate, wherein the reflective layer is configured to receive the second portion of incident light, and reflect the second portion of incident light in the direction toward the liquid crystal layer,
    wherein a center line of the second opening coincides with a center line of the region of the second substrate, and the diameter of the second opening is greater than or equal to a diameter of the region of the second substrate.

5. The liquid crystal lens according to claim 4, wherein the reflective layer is formed as a reflective film arranged on the base, or formed as a reflective prism structure on the base.

6. The liquid crystal lens according to claim 4, wherein the reflective structure layer further comprises:
    a light shielding layer attached to a surface of the base distal to the first substrate.

7. The liquid crystal lens according to claim 4, further comprising:
    a transparent common electrode arranged between the first substrate and the liquid crystal layer;
    a second electrode arranged on the reflective layer and being transparent; and
    a third electrode arranged at the second opening of the first substrate and being transparent.

8. The liquid crystal lens according to claim 7, wherein the transflective layer is arranged between the liquid crystal layer and the common electrode, and an insulating layer is arranged between the transflective layer and the common electrode.

9. The liquid crystal lens according to claim 1, wherein the reflective structure layer is in direct physical contact with a surface of the second substrate proximate to the first substrate.

10. The liquid crystal lens according to claim 1, wherein an orthographic projection of the liquid crystal layer onto the first substrate coincides with an orthographic projection of the transflective layer onto the first substrate; or the orthographic projection of the liquid crystal layer onto the first substrate is within a range of the orthographic projection of the transflective layer on the first substrate, and an area of the orthographic projection of the liquid crystal layer onto the first substrate is smaller than an area of the orthographic projection of the transflective layer onto the first substrate.

11. The liquid crystal lens according to claim 1, wherein an orthographic projection of the transflective layer onto the first substrate is within a range of an orthographic projection of the liquid crystal layer onto the first substrate.

12. The liquid crystal lens according to claim 1, wherein an infrared-light-and-ultraviolet-light-blocking layer is attached to a surface of the second substrate distal to the first substrate.

13. The liquid crystal lens according to claim 1, wherein the second portion of incident light transmitted through the first substrate is converged to the region of the second substrate after the second portion of incident light transmitted through the first substrate is transmitted through the liquid crystal layer at least three times under control of reflection of the light adjustment structure.

14. An imaging device comprising the liquid crystal lens according to claim 1.

15. The imaging device according to claim 14, further comprising an image sensor, wherein light converged to the region of the second substrate is transmitted through the region of the second substrate toward the image sensor.

16. The imaging device according to claim 14, wherein the second portion of incident light surrounds the first portion of incident light within the first substrate.

17. The imaging device according to claim 14, wherein a transmission direction of the second portion of incident light transmitted through the liquid crystal layer toward the region of the second substrate is parallel to a secondary optical axis of a lens structure formed by the liquid crystal layer.

18. The imaging device of claim 14, wherein the reflective structure layer comprises:

a base provided with a tapered curved groove, wherein the tapered curved groove penetrates through the base in a direction perpendicular to the first substrate and the second substrate, the tapered curved groove is provided with a first opening on an end surface of the base proximate to the first substrate, and provided with a second opening on an end surface of the base distal to the first substrate, and a diameter of the first opening is greater than a diameter of the second opening; and a reflective layer arranged on a surface of the tapered curved groove proximate to the first substrate, wherein the reflective layer is configured to receive the second portion of incident light, and reflect the second portion of incident light in the direction toward the liquid crystal layer, wherein a center line of the second opening coincides with a center line of the region of the second substrate, and the diameter of the second opening is greater than or equal to a diameter of the region of the second substrate.

* * * * *